(12) United States Patent
Wilson et al.

(10) Patent No.: US 9,823,670 B2
(45) Date of Patent: Nov. 21, 2017

(54) ENGINE DRIVEN PUMP (EDP) AUTOMATIC DEPRESSURIZATION SYSTEM

(71) Applicant: The Boeing Company, Chicago, IL (US)

(72) Inventors: Thomas Michael Wilson, Seattle, WA (US); Thomas Raymond Hasenoehrl, Stanwood, WA (US); Edmond C. Chin, Lynnwood, WA (US); Mark William Lesyna, Everett, WA (US)

(73) Assignee: The Boeing Company, Chicago, IL (US)

( * ) Notice: Subject to any disclaimer, the term of this patent is extended or adjusted under 35 U.S.C. 154(b) by 36 days.

(21) Appl. No.: 14/552,986

(22) Filed: Nov. 25, 2014

(65) Prior Publication Data

US 2016/0147236 A1    May 26, 2016

(51) Int. Cl.

| | | |
|---|---|---|
| *G01C 23/00* | (2006.01) | |
| *G05D 1/00* | (2006.01) | |
| *G05D 3/00* | (2006.01) | |
| *G06F 3/00* | (2006.01) | |
| *G06F 17/00* | (2006.01) | |
| *G05D 16/20* | (2006.01) | |
| *B64D 41/00* | (2006.01) | |
| *B64C 13/40* | (2006.01) | |
| *B64C 25/22* | (2006.01) | |
| *B64C 13/36* | (2006.01) | |
| *F02C 7/32* | (2006.01) | |

(52) U.S. Cl.
CPC ......... *G05D 16/2066* (2013.01); *B64C 13/36* (2013.01); *B64C 13/40* (2013.01); *B64C 25/22* (2013.01); *B64D 41/00* (2013.01); *F02C 7/32* (2013.01)

(58) Field of Classification Search
CPC ...... G05D 16/2066; B64C 13/40; B64C 25/22
See application file for complete search history.

(56) References Cited

U.S. PATENT DOCUMENTS

| | | | | |
|---|---|---|---|---|
| 2005/0045764 | A1* | 3/2005 | Morgenstern | ............. B64C 3/16 244/10 |
| 2006/0260323 | A1* | 11/2006 | Moulebhar | ........... F01D 21/003 60/793 |
| 2011/0088383 | A1* | 4/2011 | Morvan | ................ F15B 20/005 60/403 |

FOREIGN PATENT DOCUMENTS

| | | | | |
|---|---|---|---|---|
| DE | EP 2107228 A1 * | 10/2009 | ............... | F01D 5/08 |
| EP | 2107228 | 4/2008 | | |

\* cited by examiner

*Primary Examiner* — Imran Mustafa
(74) *Attorney, Agent, or Firm* — Thompson Hine LLP

(57) ABSTRACT

An automatic engine driven pump (EDP) depressurization system for an aircraft is disclosed. The aircraft includes at least two EDPs driven by a main engine for converting mechanical power provided by the main engine into hydraulic power for distribution by a hydraulic system. The EDP depressurization system includes a depressurization device corresponding to each of the at least two EDPs and a control module. The depressurization devices are each energized to depressurize a respective EDP. The control module is in signal communication with each of the depressurization devices. The control module includes control logic for automatically generating a depressurization signal that energizes one of the depressurization devices based on a plurality of operational conditions of the aircraft.

18 Claims, 3 Drawing Sheets

ENGINE DRIVEN PUMP (EDP) AUTOMATIC DEPRESSURIZATION SYSTEM

FIELD

The disclosed system relates to an automatic engine driven pump (EDP) depressurization system for an aircraft and, more particularly, to a system for automatically depressurizing at least one EDP during specific flight conditions of an aircraft that indicate low demand for hydraulic power.

BACKGROUND

Power distribution systems in an aircraft operate to transfer energy from one part of the aircraft to another. Power may be distributed in various forms, including hydraulically, pneumatically, and electrically. Hydraulic power may be generated by engine driven pumps (EDPs) that are each driven by one of the aircraft main engines. In particular, each main engine of the aircraft may drive either one or two EDPs. The EDPs may be each used to convert mechanical energy generated by the one of the main engines into hydraulic power for consumption by hydraulic loads within the aircraft. Some examples of hydraulic loads within the aircraft include, but are not limited to, hydraulic actuators connected to control surfaces of the aircraft such as ailerons, elevators and rudders, as well as actuators for landing gear and doors. The demand for hydraulic power within the aircraft varies significantly during the different phases of flight. For example, hydraulic flow requirements are typically the lowest during cruise.

Those skilled in the art readily appreciate that fuel costs are a significant factor in operating an aircraft. For most commercial passenger aircraft, the cruise phase of flight usually consumes the majority of fuel. Improving the fuel efficiency of the aircraft to reduce fuel consumption, if done without impairing the operation of the aircraft, is a desirable goal.

SUMMARY

In one aspect, an automatic engine driven pump (EDP) depressurization system for an aircraft is disclosed. The aircraft includes at least two EDPs driven by a main engine for converting mechanical power provided by the main engine into hydraulic power for distribution by a hydraulic system. The EDP depressurization system includes a depressurization device corresponding to each of the EDPs and a control module. The depressurization devices are each energized to depressurize a respective EDP. The control module is in signal communication with each of the depressurization devices. The control module includes control logic for automatically generating a depressurization signal that energizes one of the depressurization devices based on a plurality of operational conditions of the aircraft.

In another aspect, a method of automatically depressurizing an engine driven pump (EDP) in an aircraft is disclosed. The method includes driving at least two EDPs by a main engine of the aircraft. The method also includes converting mechanical power provided by the main engine into hydraulic power for distribution by a hydraulic system by the EDPs. The method also includes providing a depressurization device corresponding to each of the EDPs. The depressurization devices are each energized to depressurize a respective one of the EDPs. Finally, the method includes automatically generating a depressurization signal by the control module that energizes one of the depressurization devices based on a plurality of operational conditions of the aircraft.

Other objects and advantages of the disclosed method and system will be apparent from the following description, the accompanying drawings and the appended claims.

Each figure shown in this disclosure shows a variation of an aspect of the embodiments presented, and only differences will be discussed in detail.

DETAILED DESCRIPTION

Figure 1:
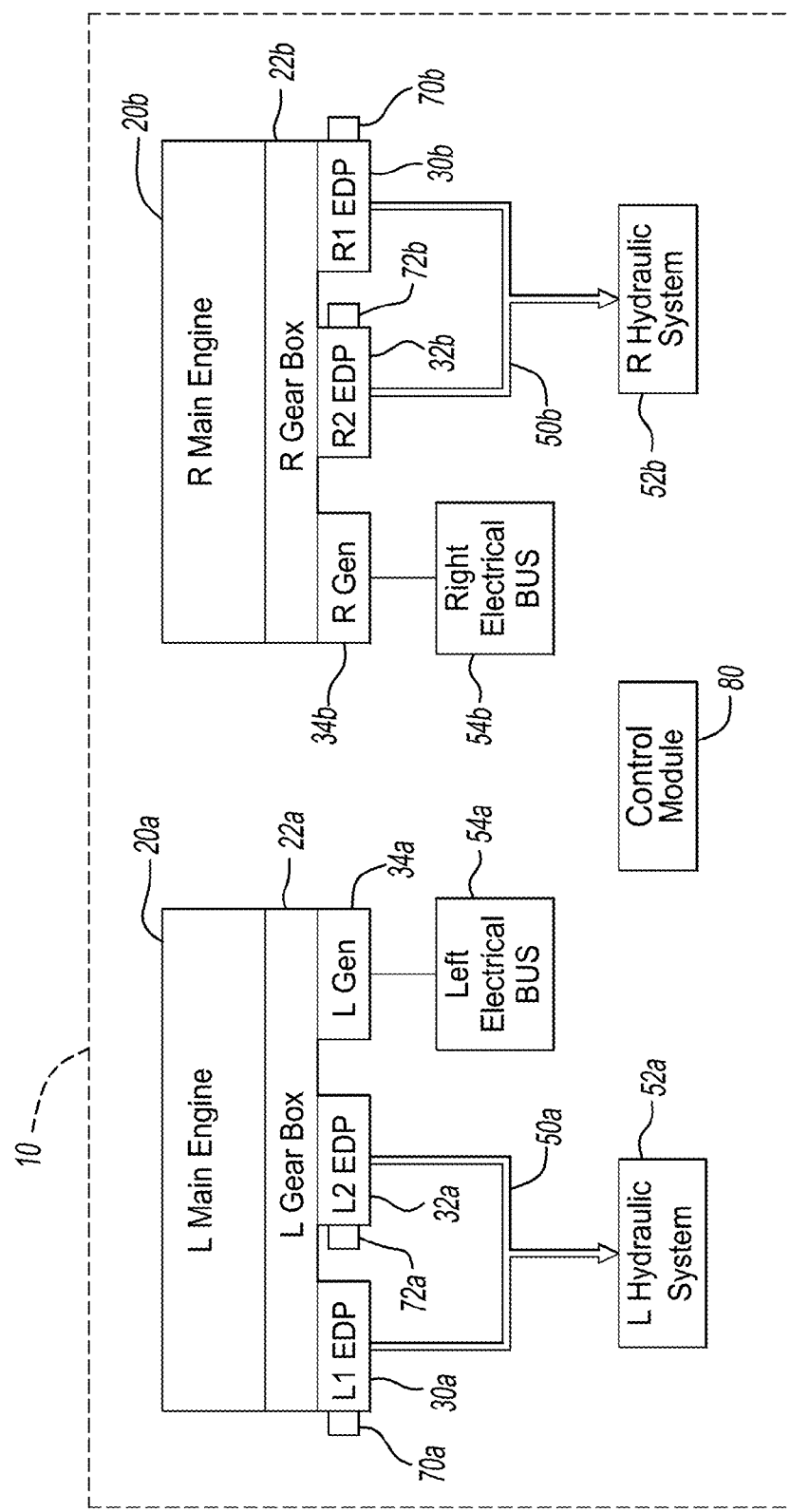
FIG. 1 is an exemplary schematic diagram of an aircraft having an automatic engine driven pump (EDP) depressurization system that includes two EDPs for each main engine and a control module.

As shown in FIG. 1, the disclosed aircraft 10 according to an aspect of the disclosure may include a left main engine 20a and a right main engine 20b. Mechanical power generated by the left and right main engines 20a, 20b may be converted into hydraulic or electrical power for distribution about the aircraft 10, and for eventual consumption by one or more loads within the aircraft 10. In the embodiment as shown, a left gearbox 22a may be used to integrate or couple the left main engine 20a to at least two engine driven pumps (EDPs) and an electric generator. Specifically, the left gearbox 22a may be used to couple the left main engine 20a to a first left EDP 30a, a second left EDP 32a, and a left engine generator 34a. Similarly, a right gearbox 22b may be used to couple the right main engine 20b to a first right EDP 30b, a second right EDP 32b, and a right engine generator 34b.

The first left EDP 30a and the second left EDP 32a convert mechanical power provided by the left main engine 20a into hydraulic power for distribution by a left hydraulic power distribution channel 50a. The left hydraulic power distribution channel 50a may be used to provide power to a left hydraulic system 52a. Similarly, the first right EDP 30b and the second right EDP 32b convert mechanical power provided by the right main engine 20b into hydraulic power for distribution by a right hydraulic power distribution channel 50b. The right hydraulic power distribution channel 50b may be used to provide power to a right hydraulic system 52b. The left and right hydraulic systems 52a, 52b include various hydraulic loads located within the aircraft 10. Some examples of hydraulic loads within the aircraft 10 include, but are not limited to, hydraulic actuators for ailerons, elevators, rudders, landing gears, and doors.

Those skilled in the art will readily appreciate that while FIG. 1 illustrates the aircraft 10 having only two main engines, it is to be understood that the present disclosure may also apply to an aircraft having more than two main engines as well. For example, in an alternative embodiment the aircraft 10 may include four main engines, namely two left main engines and two main right engines. Each main engine may drive two EDPs. Additionally, the aircraft 10 includes two hydraulic systems, where four EDPs associated with the left main engines produce hydraulic power to a left hydraulic system and four EDPs associated with the right main engines produce hydraulic power to a right hydraulic system.

The left engine generator 34 converts mechanical power provided by the left main engine 20a into electrical power for distribution by a left electrical distribution bus 54a of the aircraft 10. Similarly, the right engine generator 44 converts mechanical power provided by the right main engine 20b into electrical power for distribution by a right electrical distribution bus 54b of the aircraft 10.

Each EDP 30a, 30b, 32a, 32b within the aircraft 10 may include a corresponding depressurization device. Specifically, the first left EDP 30a may include a depressurization device 70a, the second left EDP 32a may include a depressurization device 72a, the first right EDP 30b may include a depressurization device 70b, and the second right EDP 32b may include a depressurization device 72b. Each depressurization device 70a, 70b, 72a, 72b may be used to selectively depressurize a respective one of the EDPs 30a, 30b, 32a, 32b. Specifically, as explained in greater detail below, one or more of the EDPs 30a, 30b, 32a, 32b may be depressurized during periods of low hydraulic demand within the aircraft 10. In one exemplary embodiment, the depressurization devices 70a, 70b, 72a, 72b may each be depressurization solenoid valves.

The depressurization devices 70a, 70b, 72a, 72b may each be de-energized when the respective EDP 30a, 30b, 32a, 32b is operating. However, when one of the depressurization devices 70a, 70b, 72a, 72b is energized, this in turn depressurizes a respective EDP 30a, 30b, 32a, 32b. In particular, a hydro-mechanical device of the EDP 30a, 30b, 32a, 32b, which adjusts output flow based on pressure, may be set to almost zero during depressurization. An outlet pressure of the respective EDP 30a, 30b, 30c, 30d may be minimized as well. A control module 80, the EDPs 30a, 30b, 32a, 32b, and the depressurization devices 70a, 70b, 72a, 72b comprise an automatic EDP depressurization system. The automatic EDP depressurization system may be used automatically depressurize one or more of the EDPs 30a, 30b, 32a, 32b depending on specific operating conditions of the aircraft 10 which indicate low hydraulic demands within the aircraft 10, which is described in greater detail below.

Figure 2:
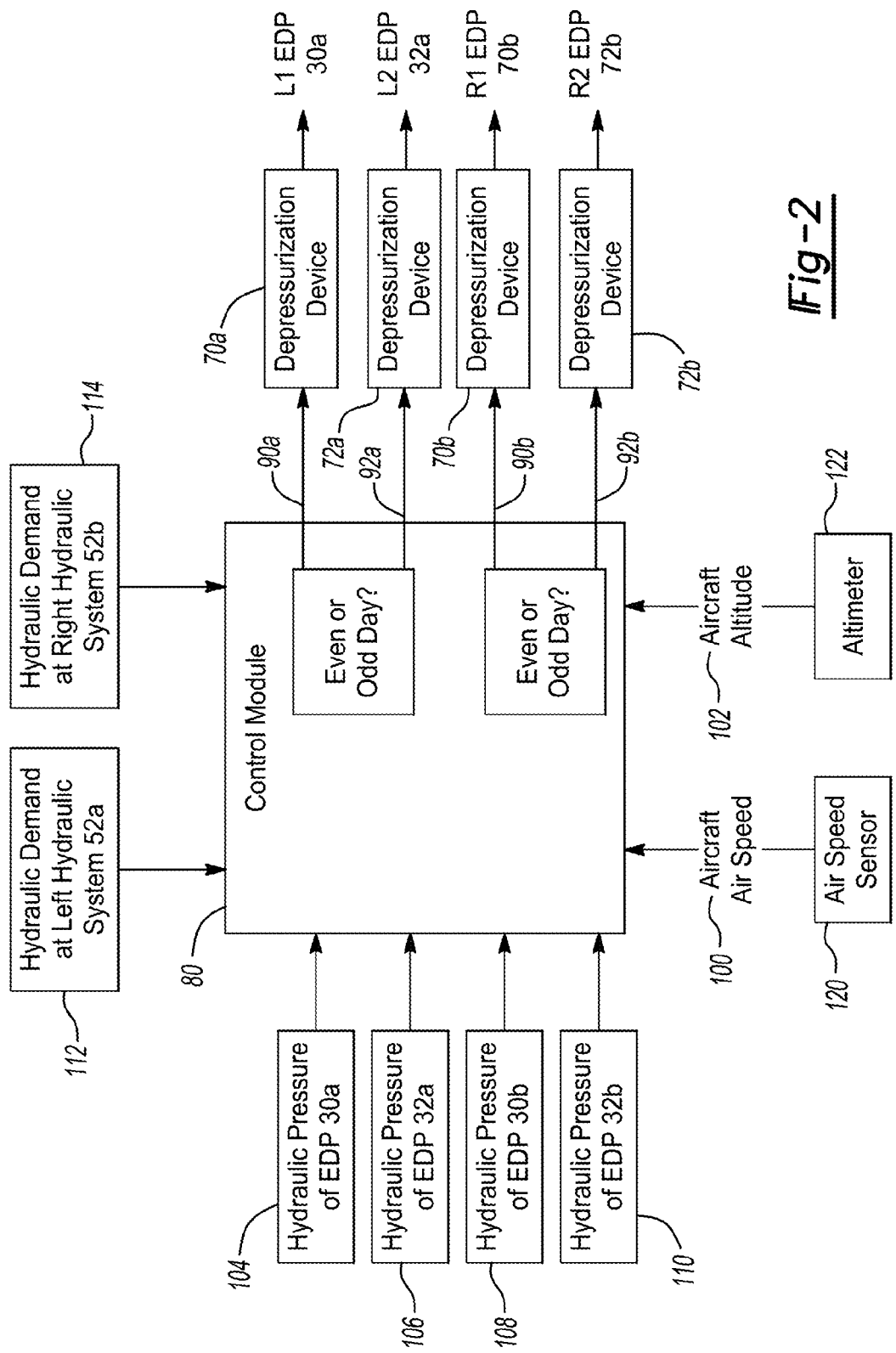
FIG. 2 is a block diagram illustrating the inputs and outputs of the control module illustrated in FIG. 1.

Referring to both FIGS. 1 and 2, a control module 80 may be in signal communication with each of the depressurization devices 70a, 70b, 72a, 72b. The control module 80 may refer to, or be part of, an application specific integrated circuit (ASIC), an electronic circuit, a combinational logic circuit, a field programmable gate array (FPGA), a processor (shared, dedicated, or group) comprising hardware or software that executes code, or a combination of some or all of the above, such as in a system-on-chip. In one non-limiting embodiment, the control module 80 may be the flight control module (FCM) of the aircraft 10. Those skilled in the art will readily appreciate that while a single control module 80 is illustrated in the figures and described, the control module 80 may also include multiple control modules as well. As explained below, the control module 80 includes control logic for automatically generating a depressurization signal that energizes one of the depressurization devices 70a, 70b, 72a, 72b based on a plurality of operational conditions of the aircraft 10.

Continuing to refer to both FIGS. 1 and 2, the control module 80 includes control logic for generating a unique pressurization signal corresponding to each depressurization device 70a, 70b, 72a, 72b. Specifically, the control module 80 includes control logic for generating a pressurization signal 90a corresponding to depressurization device 70a, a pressurization signal 92a corresponding to depressurization device 72a, a pressurization signal 90b corresponding to depressurization device 70b, and a pressurization signal 92b corresponding to depressurization device 72b. The pressurization signals 90a, 90b, 92a, 92b may either energize or de-energize a corresponding one of the depressurization devices 70a, 70b 72a, 72b. Energizing the depressurization devices 70a, 70b, 72a, 72b in turn depressurizes a corresponding one of the EDPs 30a, 30b, 32a, 32b (i.e., the pressurization signals 90a, 90b, 92a, 92b are depressurization signals). De-energizing the depressurization devices 70a, 70b, 72a, 72b in turn pressurizes a corresponding one of the EDPs 30a, 30b, 32a, 32b.

The control module 80 receives as input a plurality of specific flight conditions of the aircraft 10 indicative that the aircraft 10 is operating in cruise cycle. Those skilled in the art will readily understand that the cruise cycle refers to a substantially level portion of travel of the aircraft 10, and occurs between an ascent phase and a descent phase of flight. In the non-limiting embodiment as illustrated in FIG. 2, the plurality of specific flight conditions of the aircraft 10 indicative of the aircraft 10 operating in cruise cycle include an aircraft air speed 100 and an aircraft altitude 102. The aircraft air speed 100 may be a signal generated by an air speed sensor 120, and the aircraft altitude 102 may be a signal generated by an altimeter 122.

Referring to FIGS. 1 and 2, the control module 80 also receives as input specific operating conditions indicating the hydraulic pressure at a pump outlet of each of EDP 30a, 30b, 32a, 32b. In particular, one or more sensors may be placed at the pump outlet of each EDP 30a, 30b, 32a, 32b (the sensors are not illustrated in the figures). The sensor or sensors located at the pump outlet of the first left EDP 30a may generate a pressure signal 104 representative of hydraulic pressure at the pump outlet of the first left EDP 30a. Similarly, the sensor or sensors located at the pump outlet of the second left EDP 32a may generate a pressure signal 106 representative of hydraulic pressure at the pump outlet of the second left EDP 32a. The sensor or sensors located at the pump outlet of the first right EDP 30b may generate a pressure signal 108 representative of hydraulic pressure at the pump outlet of the first right EDP 32a. Finally, the sensor or sensors located at the pump outlet of the second right EDP 32b may generate a pressure signal 110 representative of hydraulic pressure in at the pump outlet of the second right EDP 32b.

The control module 80 also receives as input specific operating conditions indicating the hydraulic power demands of both the left hydraulic system 52a and the right hydraulic system 52b of the aircraft 10. Specifically, the control module 80 receives as input a hydraulic demand signal 112 representative of the hydraulic power demands of the left hydraulic system 52a. The control module 80 also receives as input a hydraulic demand signal 114 representative of the hydraulic power demands the right hydraulic system 52b.

Both the left and right hydraulic demand signals 112, 114 may indicate either high hydraulic demand or low hydraulic demand. High hydraulic demand indicates that the hydraulic power demands of either the left or right hydraulic system 52a, 52b is greater than the amount of power that only one of the two EDPs driven by one of the respective main engines 20a, 20b is capable of generating. For example, if the hydraulic power demand of the left hydraulic system 52a is greater than the amount of power that only one of the two EDPs 30a, 32a driven by the main engine 20a is capable of generating, then the left hydraulic system 52a has high hydraulic demand. Low hydraulic demand indicates that the hydraulic power demands of either the left or right hydraulic system 52a, 52b is less than the amount of power that only one of the two EDPs driven by one of the main engines 20a, 20b is capable of generating. For example, if the hydraulic power demand of the left hydraulic system 52a is less than the amount of power that only one of the two EDPs 30a, 32a driven by the main engine 20a is capable of generating, then the left hydraulic system 52a has low hydraulic demand.

In one embodiment, the left hydraulic demand signal 112 may be generated based on the actuator activation command rates and flow demands generated by the hydraulic actuators located within the left hydraulic system 52a. Similarly, the right hydraulic demand signal 114 may be generated based on the actuator command rates and flow generated by the hydraulic actuators located within the right hydraulic system 52b. Alternatively, in another embodiment, the left and right hydraulic demand signals 112, 114 may be determined based on a flap lever handle position of the aircraft 10. Specifically, if the flap lever handle is in an up position, this indicates high hydraulic demand. In yet another embodiment, the left and right hydraulic demand signals 112, 114 may be determined based on a landing gear lever of the aircraft 10. If the landing gear lever is in a down position, this indicates high hydraulic demand.

Continuing to refer to FIGS. 1 and 2, the control module 80 includes control logic for monitoring the plurality of specific flight conditions of the aircraft 10 indicative of the aircraft 10 operating in cruise cycle (i.e., the aircraft air speed 100 and the aircraft altitude 102). The control module 80 also includes control logic for determining whether the aircraft 10 is operating in cruise cycle based on the plurality of specific flight conditions of the aircraft 10. Specifically, if the aircraft air speed 100 exceeds a threshold air speed and the aircraft altitude 102 exceeds a threshold altitude, then the control module 80 determines that the aircraft 10 is operating in cruise cycle. In one exemplary embodiment, the threshold air speed is about 270 knots and the threshold altitude is about 1828 meters (6000 feet). Those skilled in the art will readily appreciate that these values are merely exemplary in nature and may be modified.

The control module 80 also includes control logic for monitoring each of the pressure signals 104, 106, 108, 110 indicative of the hydraulic pressure at the pump outlet of the respective EDPs 30a, 30b, 32a, 32b. The control module further includes control logic for determining if the pressure signal 104 indicative of the hydraulic pressure at the pump outlet of the first left EDP 30a and the pressure signal 106 indicative of the hydraulic pressure at the pump outlet of the second left EDP 32a both exceed a left threshold hydraulic pressure. The left threshold hydraulic pressure is representative of the pressure required by the left hydraulic system 52a when the aircraft 10 is operating in cruise cycle. Those skilled in the art will readily appreciate that the demand for hydraulic pressure is usually relatively low when the aircraft 10 is operating in cruise cycle.

Similarly, the control module further includes control logic for determining if the pressure signal 108 indicative of the hydraulic pressure at the pump outlet of the first right EDP 30b and the pressure signal 110 indicative of the hydraulic pressure at the pump outlet of the second right EDP 32b both exceed a right threshold hydraulic pressure. The right threshold hydraulic pressure is representative of the pressure required by the right hydraulic system 52a when the aircraft 10 is operating in cruise cycle. In one non-limiting embodiment, the left and right threshold hydraulic pressures may be about 19.3 megapascal (2800 psi). Those skilled in the art will readily appreciate that this value is merely exemplary in nature and may be modified.

The control module 80 further includes control logic for monitoring each of the left and right hydraulic demand signals 112, 114. The control module 80 also includes control logic for determining if the left hydraulic system 52a has high hydraulic demand or low hydraulic demand based on the left hydraulic demand signal 112. Similarly, the control module 80 also includes control logic for determining if the right hydraulic system 52b has high hydraulic demand or low hydraulic demand based on the right hydraulic demand signal 114. As explained above, high hydraulic demand indicates that the hydraulic power demands of either the left or right hydraulic systems 52a, 52b is greater than the amount of power that only one of the two EDPs driven by one of the main engines 20a, 20b is capable of generating, and low hydraulic demand indicates that the hydraulic power demands of either the left or right hydraulic systems 52a, 52b is less than the amount of power that only one of the two EDPs driven by one of the main engines 20a, 20b is capable of generating.

Referring to both FIGS. 1 and 2, the control module 80 further includes control logic for generating one of the pressurization signals 90a, 92a for energizing one of the left depressurization devices 70a, 72a based on if the aircraft 10 is operating in cruise cycle, if the pressure signal 104 and the pressure signal 106 both exceed the left threshold hydraulic pressure, and if the left hydraulic demand signal 112 indicates the left hydraulic system 52a has low hydraulic demand. In other words, the control module 80 includes control logic for energizing one of the two left depressurization devices 70a, 72a, which in turn depressurizes one of the two left EDPs 30a, 32a that correspond to the left main engine 20a. Those skilled in the art will readily appreciate that depressurizing one of the two left EDPs 30a, 32a may improve the amount of fuel burn of the left main engine 20a while the aircraft 10 is operating in cruise cycle.

In one embodiment, the control module 80 may generate the pressurization signal 90a, which in turn depressurizes the first left EDP 30a only on even calendar days (i.e., April 2, May 4, etc.). Similarly, the control module 80 may generate the pressurization signal 92a, which in turn depressurizes the second left EDP 32a only on odd calendar days (i.e., April 7, May 11, etc.). The depressurizing of the two EDPs 30a, 32a may be alternated between odd and even calendar days in order to balance the operating hours.

In one embodiment, the control module 80 may not generate the one of the pressurization signals 90a, 92a unless the aircraft 10 is operating in cruise cycle, the pressure signal 104 and the pressure signal 106 both exceed the left threshold hydraulic pressure, and the left hydraulic system 52a has low hydraulic demand for a threshold time period. In one embodiment, the threshold time period is at least about thirty seconds. However, those skilled in the art will readily appreciate that these values are merely exemplary in nature and may be modified.

Continuing to refer to both FIGS. 1 and 2, the control module 80 includes similar control logic for also depressurizing one of the two right EDPs 30b, 32b that correspond to the right main engine 20b. It is to be understood that the two left EDPs 30a, 32a driven by the left main engine 20a may be depressurized independently of the two right EDPs 30b, 32b driven by the right main engine 20b. Specifically, the control module 80 further includes control logic for generating one of the pressurization signals 90b, 92b for energizing one of the right depressurization devices 70b, 72b based on if the aircraft 10 is operating in cruise cycle, if the pressure signal 108 and the pressure signal 110 both exceed the right threshold hydraulic pressure, and if the right hydraulic demand signal 114 indicates the right hydraulic system 52b has low hydraulic demand.

In one embodiment, the control module 80 may generate the pressurization signal 90b, which in turn depressurizes the first right EDP 30b only on even calendar days. Similarly, the control module 80 may generate the pressurization signal 92b, which in turn depressurizes the second right EDP 32b only on odd calendar days. Moreover, the control module 80 may not generate the one of the pressurization signals 90b, 92b unless the aircraft 10 is operating in cruise cycle, the pressure signals 108 and 106 both exceed the right threshold hydraulic pressure, and the right hydraulic system 52b has low hydraulic demand for the threshold time period (e.g., thirty seconds).

Figure 3:
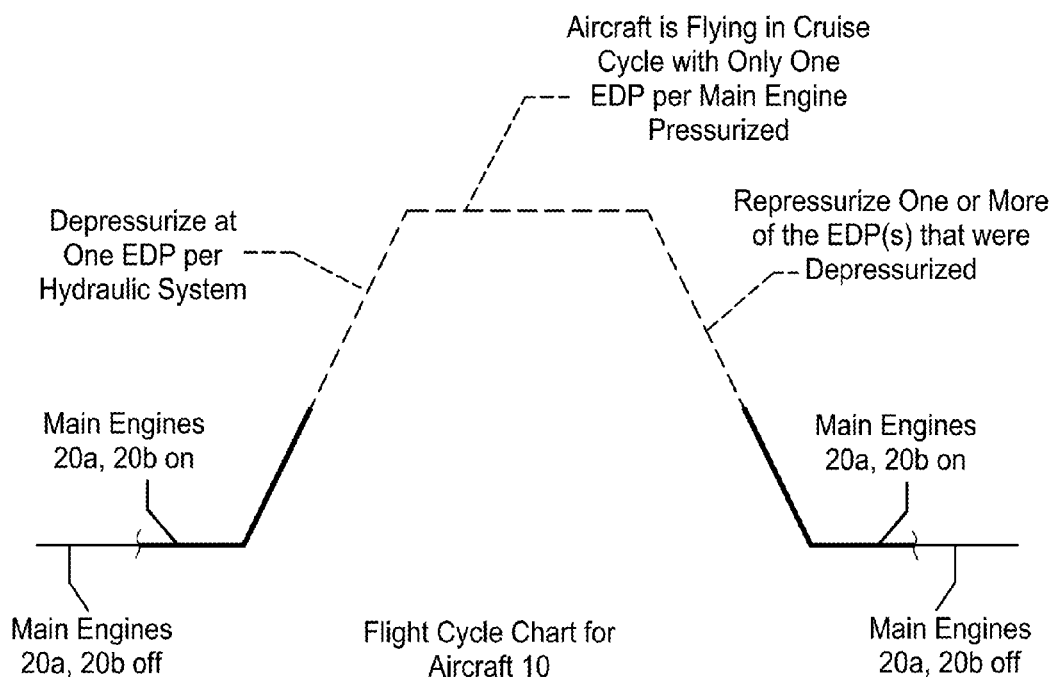
FIG. 3 is an exemplary flight cycle chart of the aircraft shown in FIG. 1.

FIG. 3 is an illustration of an exemplary flight cycle chart of the aircraft 10 shown in FIG. 1. Referring to FIGS. 1-3, the bold solid line of the flight cycle chart indicates that all of the EDPs 30a, 30b, 32a, 32b within the aircraft 10 are pressurized. The dashed line indicates that one or more EDPs 30a, 30b, 32a, 32b within the aircraft 10 are depressurized during cruise cycle. As seen in FIG. 3, one or more of the EDPs 30a, 30b, 32a, 32b that are depressurized during cruise cycle may also be automatically re-pressurized based on specific operating conditions of the aircraft 10. For example, as explained in greater detail below, if the aircraft 10 begins descent, if one of the EDPs that are currently operating begin to lose pressure, or if the hydraulic demands of either the left hydraulic system 52a or the right hydraulic system 52b increase, then the control module 80 may automatically re-pressurize one or more of the EDPs 30a, 30b, 32a, 32b that are currently depressurized. Specifically, the control module 80 may generate one or more additional pressurization signals 90a, 90b, 92a, 92b that re-pressurize a respective one of the EDPs 30a, 30b, 32a, 32b.

Continuing to refer to FIGS. 1-3, if the aircraft 10 flies below a reactivation altitude for a second threshold time period, then any of the EDPs 30a, 30b, 32a, 32b that are currently depressurized may be re-pressurized. Specifically, the control module 80 generates one or more additional pressurization signals 90a, 90b, 92a, 92b for de-energizing one or more of the corresponding depressurization devices 70a, 70b 72a, 72b if the aircraft 10 flies below the activation altitude for the second threshold time period. Any of the EDPs 30a, 30b, 32a, 32b that were previously depressurized may be re-pressurized, and may resume normal operation once the respective depressurization devices 70a, 70b 72a, 72b are de-energized.

In one embodiment, the reactivation altitude may be about 1768 meters (5800 feet) and the second threshold time period may be at least thirty seconds. The reactivation altitude may indicate that the aircraft 10 has begun descent, and is no longer operating in cruise cycle. Alternatively or in addition to the reactivation altitude, if the aircraft 10 travels below a reactivation air speed for the second threshold time period, then any of the EDPs 30a, 30b, 32a, 32b that we previously deactivated may be reactivated. In one embodiment, the activation air speed is about eighty knots.

The control module 80 also includes control logic for automatically re-pressurizing one of the left EDPs 30a, 32a driven by the left main engine 20a based on the hydraulic pressure at the pump outlet of the left EDPs 30a, 32a. Specifically, the control module 80 includes control logic for re-pressurizing a specific one of the left EDPs 30a, 32a that was previously depressurized based on the selected one of the left EDPs 30a, 32a falling below a reactivation pressure. The reactivation pressure may indicate that selected one of the left EDPs 30a, 32a is losing pressure during operation, or has a fault. Specifically, the control module 80 includes control logic for generating one of the pressurization signals 90a, 92a for de-energizing one of the left depressurization devices 70a, 72b based on if the pressure signal 104 or the pressure signal 106 falls below the reactivation pressure for the second threshold time period. In one embodiment, the reactivation pressure is about 12.4 megapascal (1800 psi).

Although control logic for re-pressuring the selected one of the left EDPs 30a, 32a is described, it is to be understood that the control module 80 also includes control logic for automatically re-pressurizing one of the right EDPs 30b, 32b driven by the right main engine 20b. Specifically, the control module 80 also includes control logic for re-pressurizing a specific one of the right EDPs 30b, 32b that was previously depressurized if the selected one of the right EDPs 30b, 32b falls below the reactivation pressure as well.

The control module 80 further includes control logic for re-pressurizing the selected one of the left EDPs 30a, 32a that was previously depressurized if the hydraulic demand of the left hydraulic system 52a increases during cruise cycle from low hydraulic demand to high hydraulic demand. Specifically, the control module 80 includes control logic for de-energizing one of the depressurization devices 70a, 72b if the left hydraulic demand signal 112 indicates the left hydraulic system 52a has switched from low hydraulic demand to high hydraulic demand. It is to be understood that the control module 80 includes control logic for also automatically re-pressurizing one of the right EDPs 30b, 32b driven by the right main engine 20b. Specifically, the control module 80 also includes control logic for re-pressurizing the selected one of the right EDPs 30b, 32b that was previously depressurized if the right hydraulic demand signal 114 indicates the right hydraulic system 52b has switched from low hydraulic demand to high hydraulic demand.

Referring generally to the figures, the disclosed automatic EDP depressurization system provides an efficient, automated approach for automatically depressurizing one or more EDPs located within an aircraft during the cruise cycle of the aircraft. Those skilled in the art will appreciate that the cruise phase of flight typically consumes the majority of fuel in the aircraft. Automatically depressurizing one or more of the EDPs within the aircraft improves fuel burn efficiency on the aircraft, without the need for input by a pilot of the aircraft. Moreover, the disclosed automatic EDP depressurization system also provides an approach for also re-pressurizing one or more of the EDPs if the aircraft begins descent, if one of the EDPs that are currently operating begin to lose pressure, or if the hydraulic demands of either the left hydraulic system or the right hydraulic system increase.

While the forms of apparatus and methods herein described constitute preferred aspects of this disclosure, it is to be understood that the disclosure is not limited to these precise forms of apparatus and methods, and the changes may be made therein without departing from the scope of the disclosure.

What is claimed is:

1. An automatic engine driven pump (EDP) depressurization system for an aircraft, the aircraft including at least two EDPs driven by a main engine for converting mechanical power provided by the main engine into hydraulic power for distribution by a hydraulic system, the EDP depressurization system comprising:
  a depressurization device corresponding to each of the at least two EDPs, wherein the depressurization devices are each energized to depressurize a respective one of the at least two EDPs;

a sensor corresponding to each of the at least two EDPs, wherein the sensor is located at an exit of a respective EDP and generates a signal indicative of a hydraulic pressure at a pump outlet of the respective EDP; and a control module in signal communication with each of the depressurization devices and the sensors, the control module including control logic for automatically generating a depressurization signal that energizes one of the depressurization devices based on a plurality of operational conditions of the aircraft, wherein the control module includes control logic for generating the depressurization signal if a plurality of flight conditions indicate the aircraft operating in cruise cycle, both of the at least two EDPs are operating above a threshold hydraulic pressure at the pump outlet, and if the hydraulic system has a low hydraulic demand.

2. The automatic EDP depressurization system of claim 1, wherein the control module generates the depressurization signal based on the aircraft operating in cruise cycle, both of the at least two EDPs operating above the threshold hydraulic pressure, and the hydraulic system having low hydraulic demand for a threshold time period.

3. The automatic EDP depressurization system of claim 2, wherein the threshold time period is about thirty seconds.

4. The automatic EDP depressurization system of claim 1, wherein the plurality of flight conditions include an aircraft air speed and an aircraft altitude.

5. The automatic EDP depressurization system of claim 1, wherein the threshold hydraulic pressure is representative of pressure required by the hydraulic system when the aircraft is operating in cruise cycle.

6. The automatic EDP depressurization system of claim 1, wherein the low hydraulic demand indicates that hydraulic power demands of the hydraulic system are less than an amount of power that only one of the at least two EDPs is capable of generating, and wherein a high hydraulic demand indicates that the hydraulic power demands of the hydraulic system are more than an amount of power that only one of the at least two EDPs is capable of generating.

7. The automatic EDP depressurization system of claim 1, wherein the depressurization signal energizes one of the depressurization devices based on a calendar day date.

8. The automatic EDP depressurization system of claim 7, wherein a first depressurization device is energized if the calendar day date is an even calendar day, and wherein a second depressurization device is energized if the calendar day date is an odd calendar day.

9. The automatic EDP depressurization system of claim 1, wherein the control module includes control logic for generating a pressurization signal to de-energize a specific one of the depressurization devices that was previously energized if the aircraft flies below a reactivation altitude for a second threshold time period.

10. The automatic EDP depressurization system of claim 9, wherein the reactivation altitude indicates that the aircraft has begun descent and is no longer operating in cruise cycle.

11. The automatic EDP depressurization system of claim 1, wherein the control module includes control logic for generating a pressurization signal to de-energize a specific one of the depressurization devices that was previously energized if the aircraft travels below a reactivation air speed for a second threshold time period.

12. The automatic EDP depressurization system of claim 1, wherein the control module includes control logic for generating a pressurization signal to de-energize a specific one of the depressurization devices that was previously energized if a specific EDP that was previously depressurized operates below a reactivation pressure.

13. The automatic EDP depressurization system of claim 1, wherein the control module includes control logic for generating a pressurization signal to de-energize a specific one of the depressurization devices that was previously energized if hydraulic power demands of the hydraulic system increase from a low hydraulic demand to a high hydraulic demand.

14. A method of automatically depressurizing an automatic engine driven pump (EDP) in an aircraft, the method comprising:

driving at least two EDPs driven by a main engine of the aircraft;

converting mechanical power provided by the main engine into hydraulic power by the at least two EDPs, wherein the hydraulic power is distributed by a hydraulic system;

providing a depressurization device corresponding to each of the at least two EDPs, wherein the depressurization devices are each energized to depressurize a respective one of the at least two EDPs;

providing a sensor corresponding to each of the at least two EDPs, wherein the sensor is located at an exit of a respective EDP and generates a signal indicative of a hydraulic pressure at a pump outlet of the respective EDP; and automatically generating a depressurization signal by the control module that energizes one of the depressurization devices based on a plurality of operational conditions of the aircraft if a plurality of flight conditions indicate the aircraft operating in cruise cycle, both of the at least two EDPs are operating above a threshold hydraulic pressure at the pump outlet, and if the hydraulic system has a low hydraulic demand.

15. The method of claim 14, wherein the plurality of flight conditions include an aircraft air speed and an aircraft altitude.

16. The method of claim 14, wherein the threshold hydraulic pressure is representative of pressure required by the hydraulic system when the aircraft is operating in cruise cycle.

17. The method of claim 14, wherein the low hydraulic demand indicates that hydraulic power demands of the hydraulic system are less than an amount of power that only one of the at least two EDPs is capable of generating, and wherein a high hydraulic demand indicates that the hydraulic power demands of the hydraulic system are more than an amount of power that only one of the at least two EDPs is capable of generating.

18. The method of claim 14, comprising energizing one of the depressurization devices based on a calendar day date.

* * * * *